United States Patent
Sherry et al.

(10) Patent No.: US 11,273,891 B2
(45) Date of Patent: Mar. 15, 2022

(54) COMMUNICATION WITH UNMANNED UNDERWATER VEHICLES

(71) Applicant: Subsea 7 Limited, Sutton (GB)

(72) Inventors: Wayne Sherry, Aberdeen (GB); Mostafa Hendawy, Aberdeen (GB); William Main, Aberdeen (GB)

(73) Assignee: Subsea 7 Limited, Sutton (GB)

( * ) Notice: Subject to any disclaimer, the term of this patent is extended or adjusted under 35 U.S.C. 154(b) by 0 days.

(21) Appl. No.: 17/044,992

(22) PCT Filed: Apr. 4, 2019

(86) PCT No.: PCT/GB2019/050974
§ 371 (c)(1),
(2) Date: Oct. 2, 2020

(87) PCT Pub. No.: WO2019/193340
PCT Pub. Date: Oct. 10, 2019

(65) Prior Publication Data
US 2021/0163106 A1 Jun. 3, 2021

(30) Foreign Application Priority Data
Apr. 5, 2018 (GB) .................................... 1805635

(51) Int. Cl.
*B63G 8/00* (2006.01)
*G05D 1/00* (2006.01)

(52) U.S. Cl.
CPC .......... *B63G 8/001* (2013.01); *G05D 1/0022* (2013.01); *B63G 2008/004* (2013.01)

(58) Field of Classification Search
CPC .............. B63G 8/001; B63G 2008/004; B63G 2008/002; B63G 2008/005;
(Continued)

(56) References Cited

U.S. PATENT DOCUMENTS 5,579,285 A 11/1996 Hubert
6,260,504 B1 7/2001 Moles et al.
(Continued)

FOREIGN PATENT DOCUMENTS

CN 104703120 6/2015
CN 105515637 4/2016
(Continued)

*Primary Examiner* — Russell Frejd
(74) *Attorney, Agent, or Firm* — Levy & Grandinetti

(57) ABSTRACT

A task such as inspection is performed at a subsea location by positioning a functional unit such as an unmanned underwater vehicle to perform the task. When positioned to perform the task, the unit is then in a shadow region where wireless control signals from a subsea control transmitter are obscured by a subsea obstacle. Consequently, control signals are transmitted wirelessly through water from the control transmitter to an autonomous underwater vehicle (AUV) positioned outside the shadow region and are relayed from the AUV to the unit to control the unit to perform the task. The unit can be tethered to the AUV or can communicate with the AUV wirelessly. The AUV can move itself to improve wireless communication with the subsea control transmitter and optionally also with the unit.

40 Claims, 8 Drawing Sheets

(58) Field of Classification Search
CPC ............ B63G 2008/008; G05D 1/0022; B63B 35/40; B63B 2035/405; B63C 11/48; H04B 13/02
See application file for complete search history.

(56) References Cited

U.S. PATENT DOCUMENTS

| | | | |
|---|---|---|---|
| 6,390,012 B1 | 5/2002 | Watt et al. | |
| 6,854,410 B1 | 2/2005 | King et al. | |
| 8,437,885 B1* | 5/2013 | Beazley | G05D 1/0022 |
| | | | 701/2 |
| 8,576,665 B2* | 11/2013 | Jiang | G01D 21/00 |
| | | | 367/131 |
| 9,386,461 B2 | 7/2016 | Ramachandran et al. | |
| 2008/0144442 A1 | 6/2008 | Combee et al. | |
| 2015/0192925 A1 | 7/2015 | Moles et al. | |
| 2016/0264223 A1* | 9/2016 | Ferguson | B63G 8/001 |
| 2017/0370173 A1 | 12/2017 | Gable | |
| 2018/0079476 A1 | 3/2018 | Abdellatif et al. | |
| 2020/0070941 A1* | 3/2020 | Nohmi | F16L 55/00 |

FOREIGN PATENT DOCUMENTS

| | | |
|---|---|---|
| CN | 105871446 | 8/2016 |
| GB | 2 365 824 | 2/2002 |
| GB | 2520010 | 5/2015 |
| KR | 20140013207 | 2/2014 |
| WO | WO 91/13800 | 9/1991 |
| WO | WO 01/21476 | 3/2001 |
| WO | WO 01/21480 | 3/2001 |
| WO | WO 03/011683 | 2/2003 |
| WO | WO 2009/061562 | 5/2009 |
| WO | WO 2012042177 | 4/2012 |
| WO | WO 2012/156425 | 11/2012 |
| WO | WO 2014076075 | 5/2014 |
| WO | WO 2015/040418 | 3/2015 |
| WO | WO 2015/049678 | 4/2015 |

* cited by examiner

COMMUNICATION WITH UNMANNED UNDERWATER VEHICLES

This invention relates to unmanned underwater vehicles (UUVs), and in particular to the challenges of controlling and communicating with UUVs when they are in use underwater.

During subsea operations, for example in the oil and gas industry, it is often necessary to perform missions that involve inspection, monitoring, maintenance and construction tasks. Such tasks are generally performed by UUVs where it is inappropriate or impossible to use divers due to depth or other reasons, such as a lack of safe access.

During a mission, a UUV swims by propelling itself and steering to an underwater target such as an item of equipment or a structure installed subsea. There, the UUV uses a camera or sensor, such as a sonar system, to inspect the target or uses tools, such as a torque tool or a pump, to do work on the target.

Conventionally, UUVs have been handled from surface support vessels. The support vessel manages launch and recovery of the UUV and usually is also involved in its control. However, there is a trend toward permanent or indefinite subsea installation of UUVs to provide a resident capability at a subsea site without requiring a support vessel to remain on station at the surface. In that case, the UUV will typically have access to a subsea docking station that is integrated with or connected to convenient subsea infrastructure to receive power and to enable data communications.

Thus, subsea inspection, repair and maintenance (IRM) activities may be carried out by field-resident UUVs connected to subsea infrastructure, whether deployed from a host facility or hosted permanently underwater in dedicated docking stations.

UUVs are generally categorised as remotely-operated vehicles (ROVs) or autonomous underwater vehicles (AUVs).

ROVs are characterised by being linked physically to a power/control source such as surface support vessel via an umbilical tether that carries power and data including control signals. A typical ROV is connected to a surface vessel either directly or through a suspended tether management system (TMS), as disclosed in EP 2621796.

A human pilot flies the ROV during its subsea mission. Typically the pilot is based aboard the surface support vessel to which the ROV remains tethered throughout. However, in principle, the pilot could be located elsewhere, even on land, if communications and control systems allow.

ROVs are typically categorised as either work-class ROVs or inspection-class ROVs. Work-class ROVs are large and powerful enough to perform a variety of subsea maintenance and construction tasks, for which purpose they may be adapted by the addition of specialised skids and tools in a modular, interchangeable fashion. Such tools may, for example, include torque tools and reciprocating tools driven by hydraulic or electric motors or actuators.

Inspection-class ROVs are smaller but more manoeuvrable than work-class ROVs to perform inspection and monitoring tasks, although they may also perform light maintenance tasks such as cleaning using suitable tools. In addition to visual inspection using lights and cameras, inspection-class ROVs may hold sensors in contact with, or in close proximity to, a subsea structure such as a pipeline to inspect and monitor its condition or other parameters.

AUVs are robotic counterparts of ROVs that can use wireless systems to operate autonomously or semi-autonomously. They move from task to task on a programmed course for limited periods without a tether or other physical connection to a support facility such as a surface support vessel. Thus, an AUV flies itself automatically during its subsea mission in accordance with a predetermined program or in response to events that arise during the mission.

In the main, AUVs are used like inspection-class ROVs to perform subsea inspection and monitoring tasks. For example, WO 2012/156425 discloses how an AUV may be equipped for long-term monitoring by attaching interchangeable instrument modules to the AUV at a subsea docking station. However, AUVs have occasionally been used or proposed to perform subsea intervention tasks like those performed by work-class ROVs. AUVs that are capable of subsea intervention tasks may be referred to as autonomous intervention vehicles or AIVs but the generic term 'AUV' will be used in this specification for simplicity.

AUVs have large on-board batteries for adequate endurance but must make frequent trips to the surface or to a subsea basket, garage or dock for battery recharging and data transfer. For example, while recharging, the AUV can download data captured during preceding steps of a mission and can upload data that controls future steps of the mission. Using a subsea facility for these purposes avoids the complexity and delay of recovering the AUV to the surface on each occasion.

In principle, an AUV is capable of fully autonomous fly-to-place inspection and tooling operations. This means that the AUV can be programmed to carry out missions fully autonomously, without human intervention. However, a semi-autonomous approach may be chosen instead, involving close real-time monitoring as a prelude to human intervention in case such intervention becomes necessary.

Consequently, hybrid UUVs are also known that mix the attributes of ROVs and AUVs. For example, some UUVs may have a high level of autonomy for routine operations such as automated inspection and when transiting between work areas. However they may also provide for man-in-loop real-time control when performing sensitive tasks such as light intervention and human supervision. Thus, when communication with a UUV is possible, human operators based at the surface or onshore have access to its systems for data feedback and retain the option to take control.

Some subsea equipment or structures cannot easily be accessed by a UUV, examples being locations at the foot of platforms, mooring foundations and structures such as manifolds, pipeline end terminations (PLETs) or in-line tees (ILTs). A UUV may be too large to access some such equipment or structures or, if the UUV is tethered, the length of the tether may be a limitation. For example, the work and inspection UUVs disclosed in WO 2009/061562 only work on wellheads from outside and do not access the interior of such subsea structures.

Other subsea equipment may be difficult for a UUV to access because it is in a space that is crowded with other items, such as other equipment or structural members. An example is where densely-packed equipment is supported by framed structures such as towheads and templates. A tethered UUV may not be able to swim freely in such a space because of the risk that its tether will become entangled.

For these reasons, it is difficult for a UUV to perform work inside or beneath a subsea structure. A conventional solution to this problem is to host a resident tool on the structure itself. For example, KR 20140013207 discloses a robot mounted on a rail that extends along a subsea structure. Similarly, US 2017/370173 discloses a robotic arm that is permanently mounted on a subsea structure.

Solutions that rely upon a resident tool require the foresight to incorporate that tool when designing and installing the structure. They also lack the versatility to deal with changing requirements. In particular, the path of a rail-mounted robot and the excursion of a robotic arm are predefined and limited in relation to the range of movement of a UUV.

In addition to being fitted with a range of tooling and sensors, host UUVs may also be used to deploy standalone payloads. Examples of such payloads include tool deployment frames or sensor packages to be attached to subsea hardware, or auxiliary vehicles that serve as 'daughter craft' for access into restricted spaces. Such payloads are typically controlled by a human operator, in which case they will require a communications path through the host vehicle and nearby subsea infrastructure to the operator. For example, WO 91/13800 teaches the use of a master AUV and a slave AUV that have to be able to communicate constantly with each other without a tether between them. Thus, any signal problem due to an obstacle or excessive range could prevent the system working.

There is a particular need to maintain real-time communication between an operator and a UUV performing subsea work or inspection remotely. Real-time communication is necessary not only for data transmission but also for correct positioning. This is difficult when the UUV operates in subsea locations where communication signals may be blocked, obscured, interrupted or significantly attenuated or degraded, for example due to congestion, crowding or particles suspended in the water.

It is known that there is a risk of losing contact with an AUV operating wirelessly, especially because water is a poorer medium than air through which to transmit data signals. To address this, WO 2014/076075 teaches using several signals from subsea garages to calculate the location of an AUV without interruption.

In terms of data transmission, AUVs may have data loggers so that they do not need always to be in communication with a signal transmitter or receiver, for example by remaining within line of sight. For instance, in WO 03/011683, inspection scan data is stored locally onboard an AUV until the AUV is recovered. The delay that this causes may be acceptable for observation and inspection but it is not acceptable to provide the ongoing real-time feedback that is necessary for a UUV to perform work under human control, especially in congested areas.

Mother/child UUV systems are well known in the art. For example, U.S. Pat. Nos. 6,349,665 and 6,148,759 describe a surface/subsurface drone that communicates with an operator while hosting a tethered ROV. However, this arrangement has the same drawback as an ROV that is tethered to a surface vessel, in that the tether is prone to becoming entangled if the ROV swims into or beneath a subsea structure. Similarly, suspended garages like that disclosed in WO 2012/042177 are known in the art but they do not solve tether entanglement issues.

WO 01/21480 is concerned mainly with physical coupling of UUVs rather than with data communications between them.

WO 01/21476 and U.S. Pat. No. 6,189,476 disclose a flying latch used for AUV recovery or load lifting. The latch is tethered to a TMS that is suspended from the surface. This arrangement is not suitable for use in a congested area in view of the presence of the tether and the TMS. Also, the drawbacks of an AUV for performing inspection and work are as explained above.

U.S. Pat. No. 6,260,504 also discloses a TMS, which in this case delivers a main ROV and a smaller mini ROV. The main ROV is fully functional to accomplish the necessary task subsea but if it fails, the mini ROV can be deployed instead. Again, the presence of a tether and a TMS is disadvantageous.

WO 2015/040418 teaches a communications system that connects a surface operator to an inspection AUV via a surface vessel that is connected to a subsea relay by a wire.

WO 2015/049678 describes an autonomous mother unmanned underwater vehicle, AMUV, and one or more auxiliary unmanned underwater vehicles (UUV). The AMUV has a communication system that has an above surface antennae which it can deploy and retract.

US 2015/192925 describes a remote control system for controlling a remotely operated vehicle (ROV). The system has an ROV wireless transceiver operatively in communication with one or more wireless transceivers deployed at a distance from the ROV.

U.S. Pat. No. 5,579,285 describes a method and a device for remotely controlling and monitoring partially autonomous manned submersibles.

Against this background, the invention provides a method of performing a task at a subsea location. The method comprises: positioning a unit to perform the task, the unit then being in a shadow region where wireless control signals from a subsea control transmitter are obscured by a subsea obstacle; transmitting control signals wirelessly through water from the control transmitter to an AUV positioned outside the shadow region; and relaying the control signals from the AUV to the unit to control the unit to perform the task. The AUV may move, hover or hold its position autonomously and automatically.

The unit may, for example, be a UUV. In that case, the UUV and the AUV may be moved independently of each other's movements while relaying the control signals from the AUV to the UUV.

The method may further comprise: monitoring the signal quality of the control signals transmitted wirelessly from the control transmitter to the AUV; and moving the AUV to improve the signal quality of the control signals. For example, the AUV may be moved toward the control transmitter to improve the signal quality of the control signals. Preferably, the AUV monitors the signal quality of the control signals transmitted wirelessly from the control transmitter and moves itself autonomously to improve the signal quality of the control signals.

The unit may be carried by the AUV toward the subsea location. Then, with the AUV in an accessible region where the AUV can receive wireless control signals from the control transmitter, and preferably hovering there, the unit may be detached from the AUV to enter the shadow region and to perform the task at the subsea location.

The control signals may be relayed from the AUV to the unit along a tether that connects the unit to the AUV. In that case, the tether may be extended from the unit or from the AUV as the unit moves away from the AUV or vice versa. Similarly, the tether may be retracted onto the unit or onto the AUV as the unit moves toward the AUV or vice versa. The AUV may be moved closer to the subsea location than a deployed length of the tether.

In another approach, the control signals may be transmitted wirelessly through water from the AUV to the unit. In that case, feedback signals may be transmitted wirelessly through water from the unit to the AUV. By monitoring the signal quality of the feedback signals, the AUV may be moved, for example toward the unit, to improve the signal quality of the feedback signals. Preferably, the AUV monitors the signal quality of the feedback signals and moves itself autonomously to improve the signal quality of the feedback signals. For example, the AUV may be moved to avoid a secondary shadow region where wireless signals from the unit are obscured by a subsea obstacle.

The control signals may be conveyed to the subsea control transmitter along a wired or wireless link from a surface source. For example, the control signals may comprise instructions or commands issued by a human operator in real time.

The inventive concept also embraces a system for performing a task at a subsea location. The system of the invention comprises: a subsea control transmitter for transmitting wireless control signals through water; a unit that is positionable to perform the task in response to the control signals transmitted by the control transmitter; an AUV that is positionable to receive the control signals from the control transmitter and to relay the control signals to the unit to control the unit to perform the task; a signal monitor that is arranged to monitor the signal quality of the control signals received by the AUV; and a controller that is responsive to the signal monitor to move the AUV to improve the signal quality of the control signals received by the AUV.

Conveniently, the signal monitor and the controller are implemented on board the AUV.

A wireless link may connect the unit to the AUV to convey the control signals to the unit and to receive feedback signals from the unit. In that case, the signal monitor may be arranged to monitor the signal quality of the feedback signals received by the AUV and the controller may be responsive to the signal monitor to move the AUV to improve the signal quality of the feedback signals received by the AUV.

In another approach, a tether connects the unit to the AUV to convey the control signals to the unit and to receive feedback signals from the unit. A reel may be provided on the unit or on the AUV from which the tether can be extended as the unit moves away from the AUV or vice versa, and onto which the tether can be retracted as the unit moves toward the AUV or vice versa.

The control transmitter is suitably located on, or integrated with, a structure installed permanently subsea. The control transmitter is suitably static. A dock for the AUV may be provided on a structure installed permanently subsea.

Where the unit is a UUV, the UUV may be dockable with and detachable from the AUV.

The inventive concept extends to an AUV that comprises: a first signal receiver for receiving signals wirelessly; a communications interface for relaying the received signals to a unit separate from the AUV; a signal monitor that is arranged to monitor the signal quality of the received signals received by the receiver; and a controller that is responsive to the signal monitor to move the AUV to improve the signal quality of the received signals. The AUV is preferably capable of moving, hovering or holding its position autonomously and automatically.

The AUV may further comprise a tether for relaying the received signals to the unit. In that case, the AUV suitably comprises a reel from which the tether can be extended and onto which the tether can be retracted. Alternatively the AUV may comprise a first signal transmitter for relaying the received signals to the separate unit wirelessly.

The communications interface is suitably arranged to relay feedback signals received from the unit. In that case, the AUV may have a second signal receiver for receiving the feedback signals from the unit wirelessly. The signal monitor may then be arranged to monitor the signal quality of the received feedback signals and the controller may be responsive to the signal monitor to move the AUV to improve the signal quality of the received feedback signals. The AUV may have a second signal transmitter for relaying the received feedback signals wirelessly, for example back to a transducer that also serves as a control transmitter.

The invention enables fly-out vehicle operations using a host vehicle that serves as an autonomous communications relay. The host vehicle will be required to establish a communications link initially to nearby subsea infrastructure. This is realised by wireless means, using through-water optical, RF or acoustic communications.

In principle, of course, a communications link could be established between the host vehicle and the subsea infrastructure using a physical tether that comprises a cable with communications cores. However, having the host vehicle collect a tether to perform piloted operations would be technically difficult and would add complexity and risk to operations. There would also be a need to provide a tether system at each location that is intended to host piloted operations, which would be very expensive.

Through-water wireless communication as an alternative to a tether system solves these problems but has technical challenges too. Wireless communications devices work best within optimal ranges and require a good line of sight between transmitters and receivers. They can therefore be sensitive to shadowing from subsea equipment and structures, or to sediment and UUV thruster wash reducing signal strength.

By virtue of the invention, the host vehicle acts as a communications relay for a payload such as a daughter vehicle. The payload or daughter system could in turn be connected to the host vehicle for real time control via a physical tether or by a wireless link.

Whilst real-time control enables an ROV-like mode of operation, the AUV capabilities of the vehicle may be used to find, automatically, the best location for through-water communication to perform at its best and to hence to ensure security of communications to the payload.

The host vehicle may use quality metrics from the communications hardware to determine an optimal position for communication and to fly autonomously to that position. The host vehicle may also manage, automatically, other local systems that may cause degradation of the communications link, for example sonars, lights, sources of electrical noise or network traffic.

Where the link between the host vehicle and the payload is a further wireless through-water link rather than a physical tether, there are serial wireless links between the payload and the subsea infrastructure. In that case, the link quality control system may position the host vehicle to optimise both links and hence the overall communications link between the payload and the infrastructure.

In one example of the invention, the host vehicle hovers in a position that it has determined to be a good location for optimal communication. Then, a smaller tethered daughter craft is flown out from the hovering host vehicle in piloted mode to perform light intervention or survey on a nearby structure without restriction from long tether excursion.

The invention enables piloted operation of a UUV to perform light intervention and survey with the minimal amount of subsea hardware, primarily removing the requirement for a subsea tether, tether management system and tether connection system. The alternative of multiple network access points arranged in a mesh to give best-quality coverage would be prohibitively expensive to deploy and maintain. Advantageously, the invention allows a mesh network to be avoided or at least reduced in scale, complexity and cost.

Embodiments of the invention implement a method to perform unmanned subsea work in a congested area, the method comprising the following steps: providing a first signal transmitter on a structure close to the congested area; swimming a tetherless unmanned subsea vehicle in the congested area, wherein the tetherless vehicle comprises a second signal transmitter and remains within line of sight of the first signal transmitter; and detaching a tethered work or observation vehicle from the tetherless subsea vehicle to perform remote operation in the congested area. The line of sight is suitably a straight line between the first and second signal transmitters.

The first signal transmitter may emit or receive a wireless signal and may be equipment resident on the structure. The first signal transmitter may also exchange wired or wireless signals with a surface station.

A signal emitted by the first signal transmitter and received by the second signal transmitter may comprise instructions from a surface operator or other controller. A signal emitted by the second signal transmitter and received by the first signal transmitter may comprise data to be sent to a surface operator or other controller.

The tetherless vehicle may autonomously select a location to remain within line of sight of the first signal transmitter. In that case, the tetherless vehicle may navigate autonomously to a location closer to, or as close as possible to, the congested area that is still within line of sight of the first signal transmitter.

The tetherless vehicle may comprise a garage or docking station for the tethered vehicle. The tether of the tethered vehicle may be spooled on a reel of the tetherless vehicle. The tetherless vehicle may be parked on or within the structure between missions.

Embodiments of the invention also provide an underwater unmanned work system for working in a congested area. The system comprises: a signal transmission system comprising a first signal transmitter located on a permanent subsea structure close to the congested area and a second signal transmitter located on an unmanned tetherless vehicle. The system further comprises a tethered work vehicle that is connected by the tether to the tetherless vehicle for performing the unmanned work in the congested area. The tetherless vehicle swims to a location closer to the congested area than the length of the tether while keeping line of sight between the first signal transmitter and the second signal transmitter. The tetherless vehicle may automatically select the best location, or at least an adequate location, for acceptable signal transmission.

In summary, the invention allows a task such as inspection to be performed at a subsea location by positioning a functional unit such as a UUV to perform the task. When positioned to perform the task, the unit may be in a shadow region where wireless control signals from a subsea control transmitter are obscured by a subsea obstacle. In that case, control signals may be transmitted wirelessly through water from the control transmitter to an AUV positioned outside the shadow region and may be relayed from the AUV to the unit to control the unit to perform the task.

The unit may be tethered to the AUV for communications or may communicate with the AUV wirelessly. The AUV may move itself to improve wireless communication with the subsea control transmitter and optionally also with the unit.

In order that the invention may be more readily understood, reference will now be made, by way of example, to the accompanying drawings in which.

Figure 1:
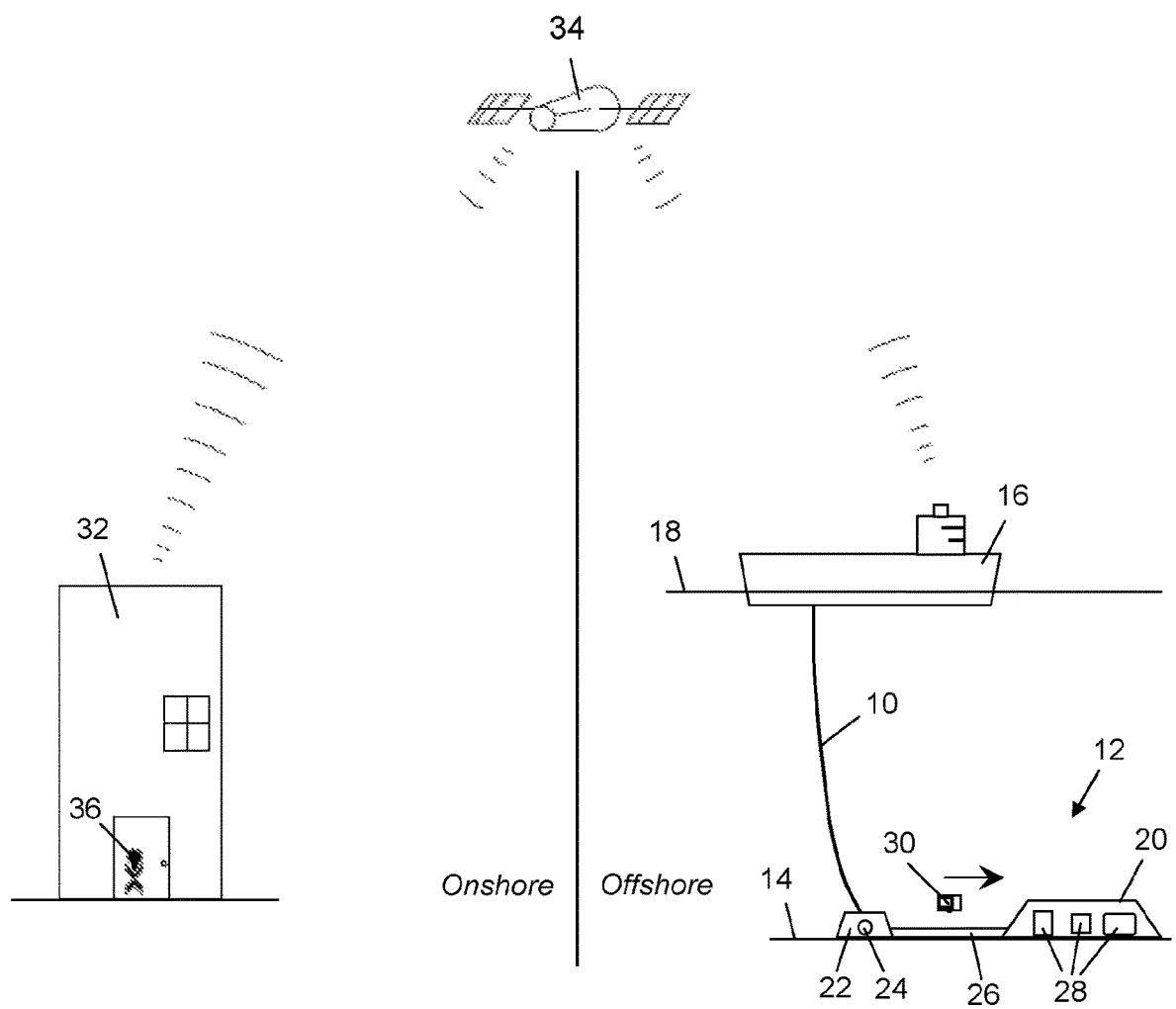
FIG. 1 is a schematic diagram representing offshore-onshore communications between subsea infrastructure and an onshore base via a satellite link.
Figure 2:
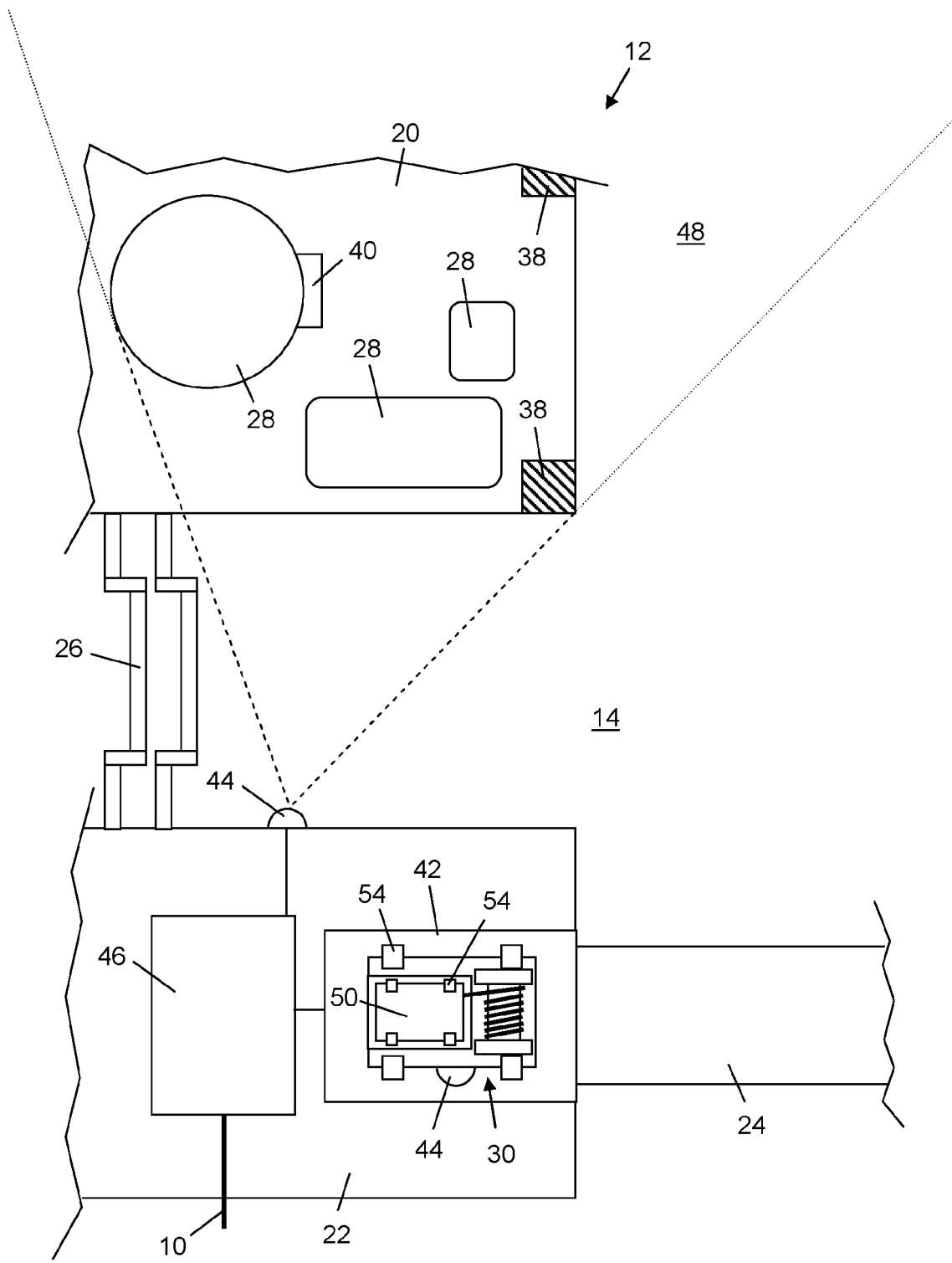
FIG. 2 is a schematic part-sectional plan view of the subsea infrastructure shown in FIG. 1.
Figure 3:
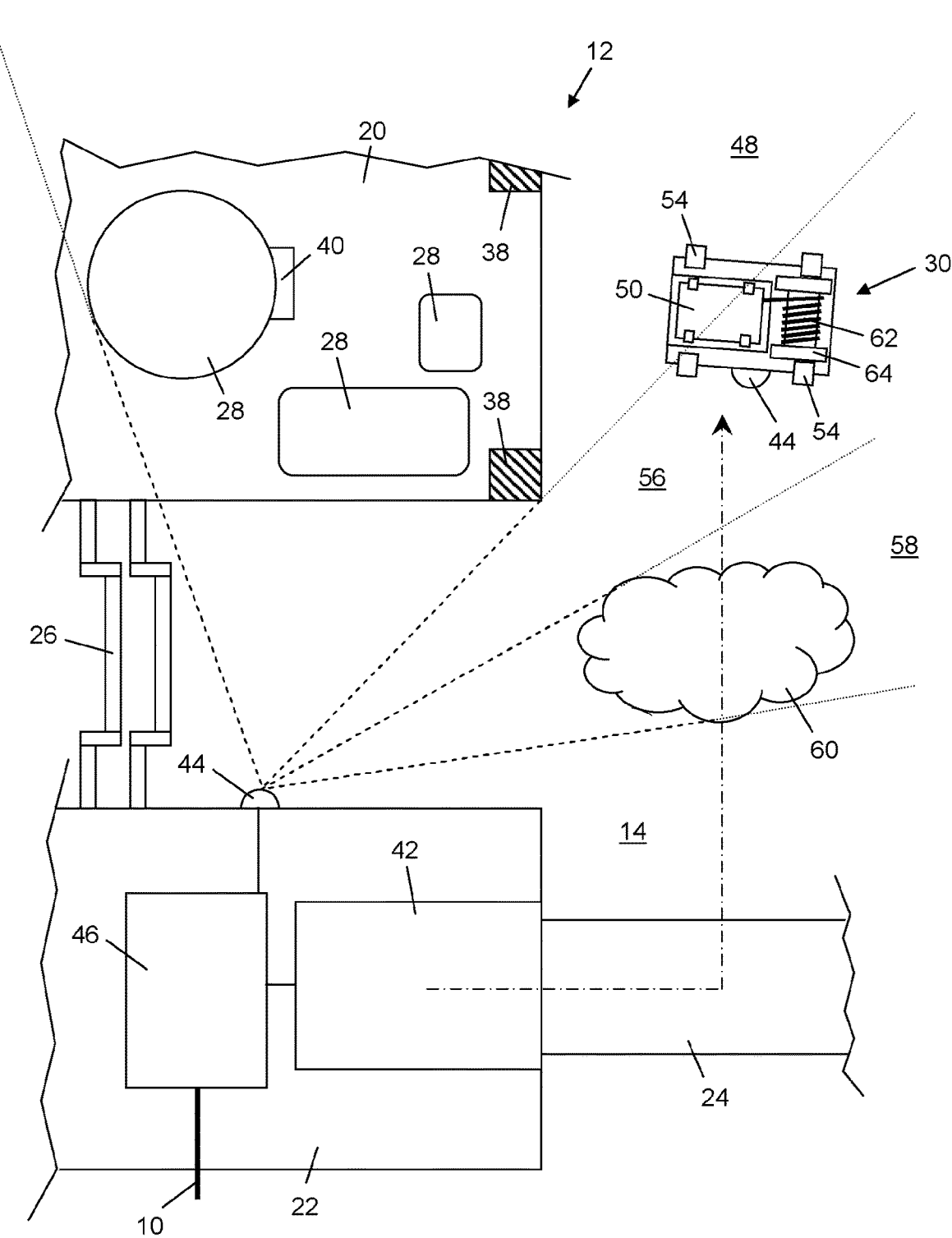
Figure 4:
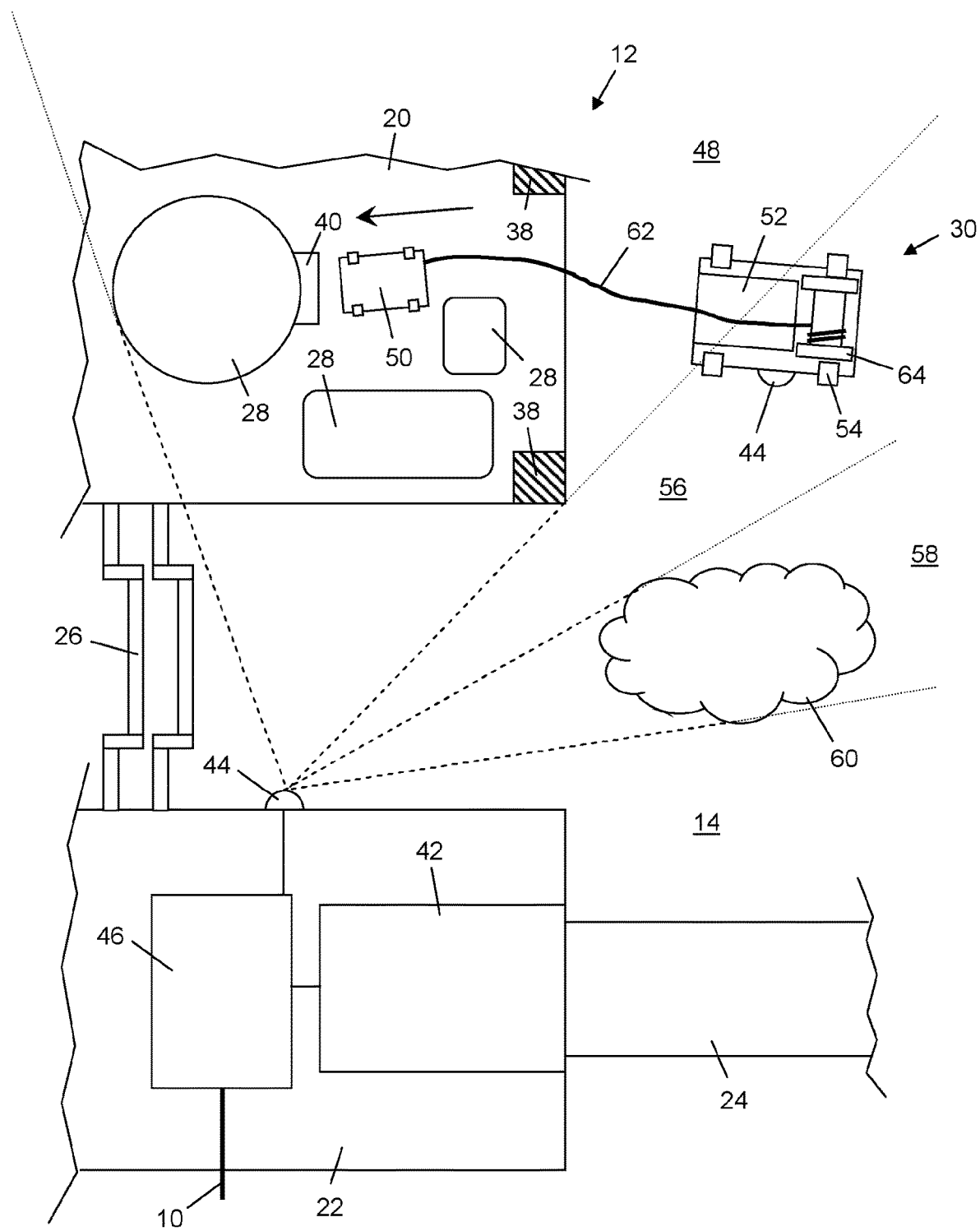
Figure 5:
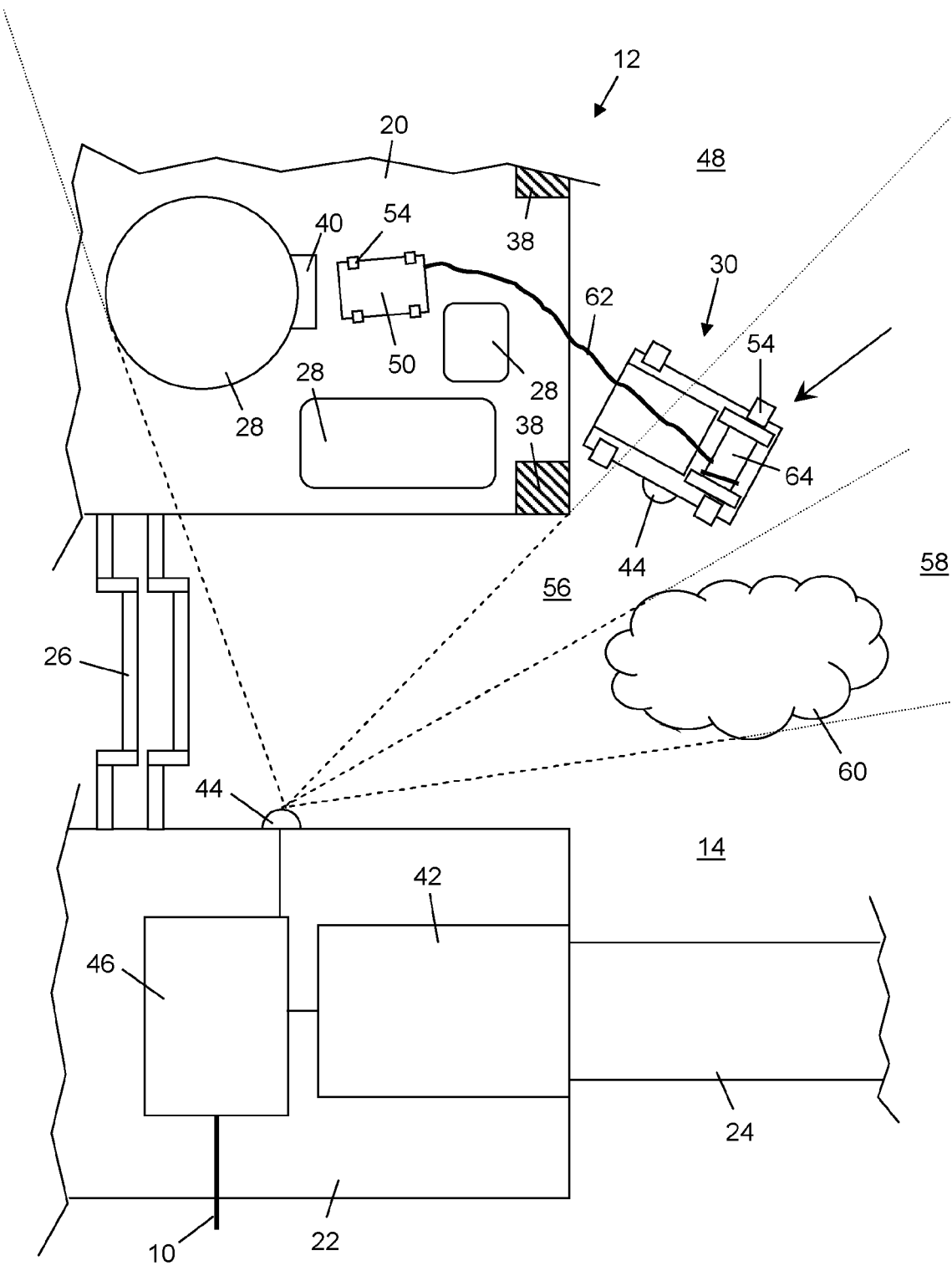
Figure 6:
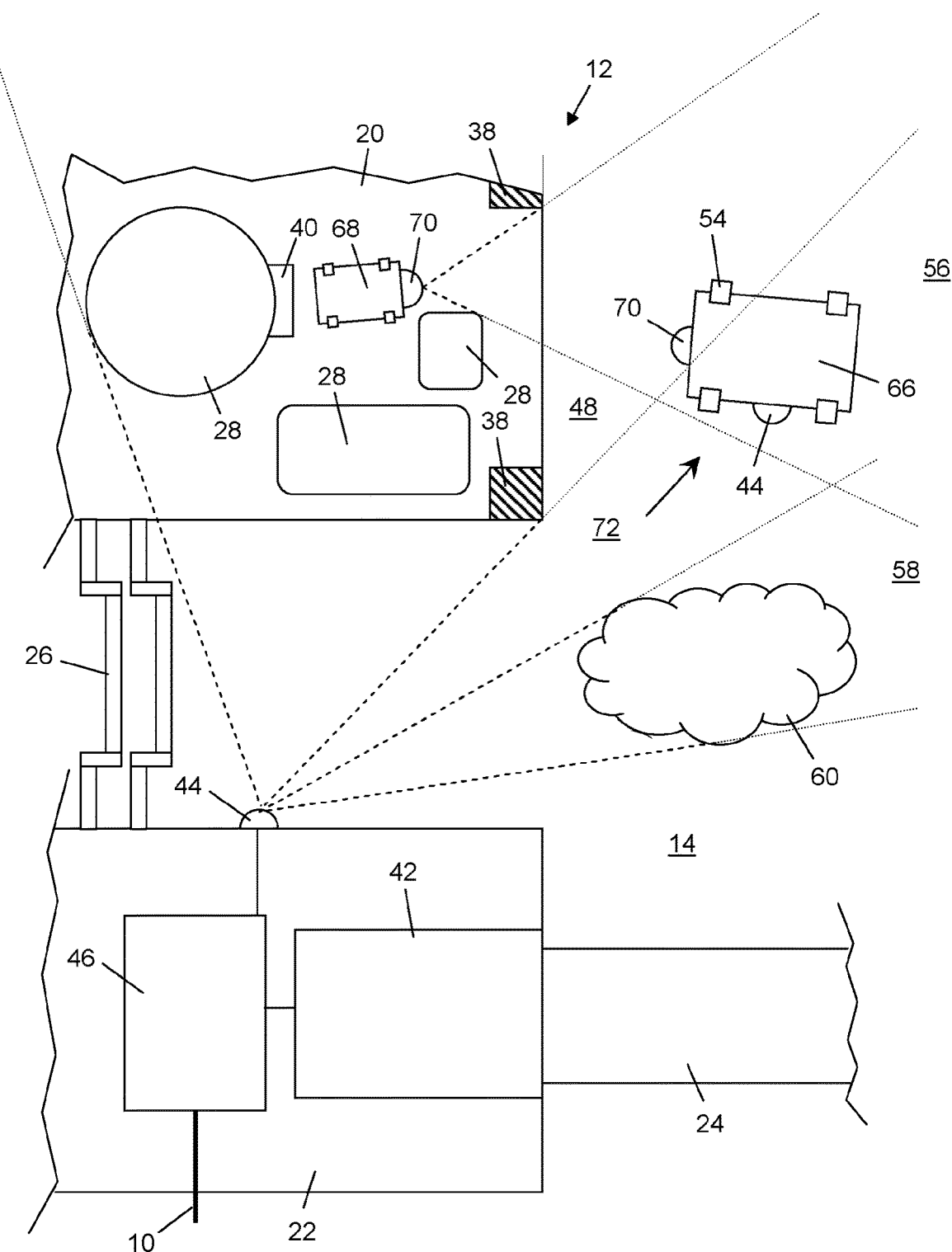
Figure 7:
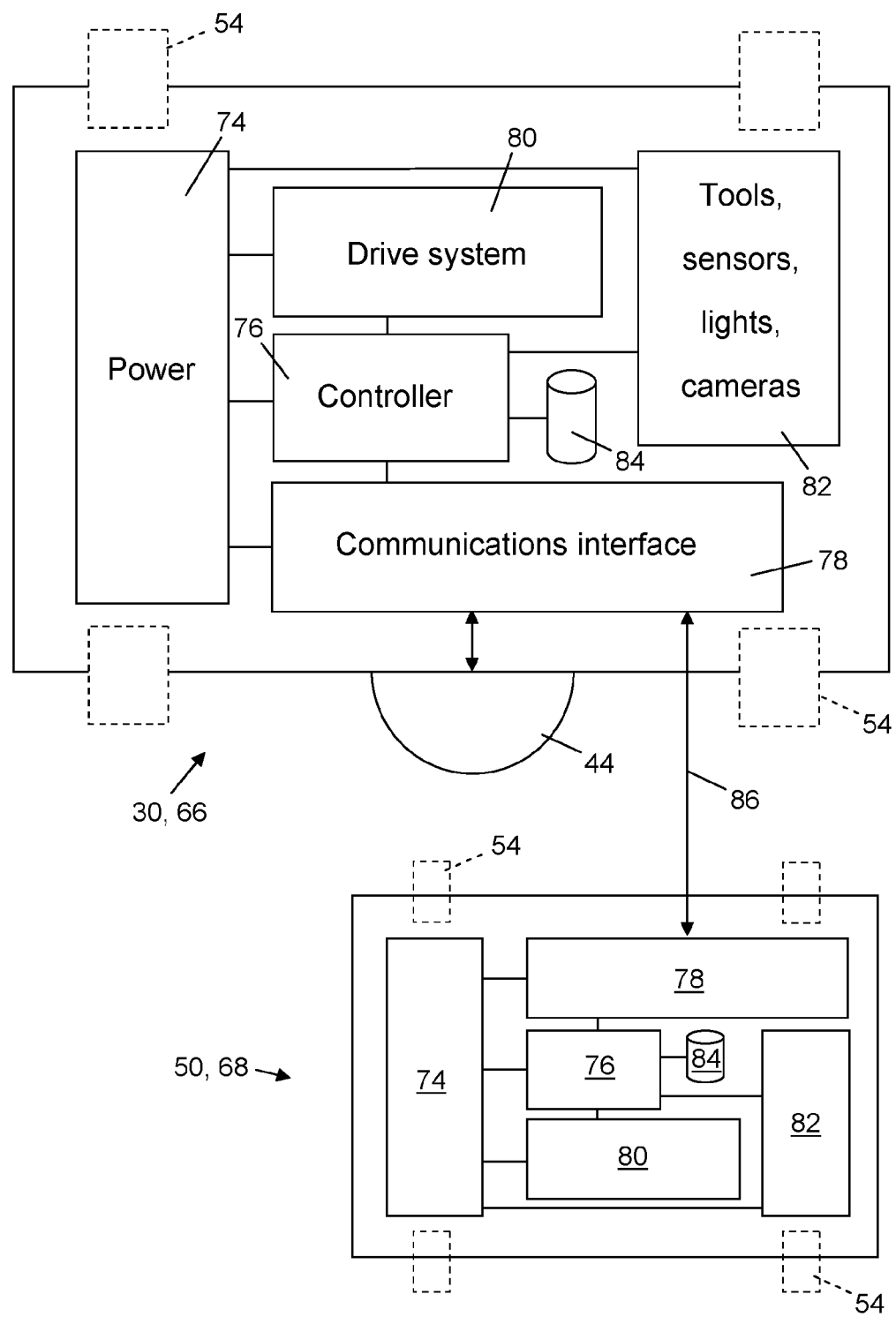
Figure 8:
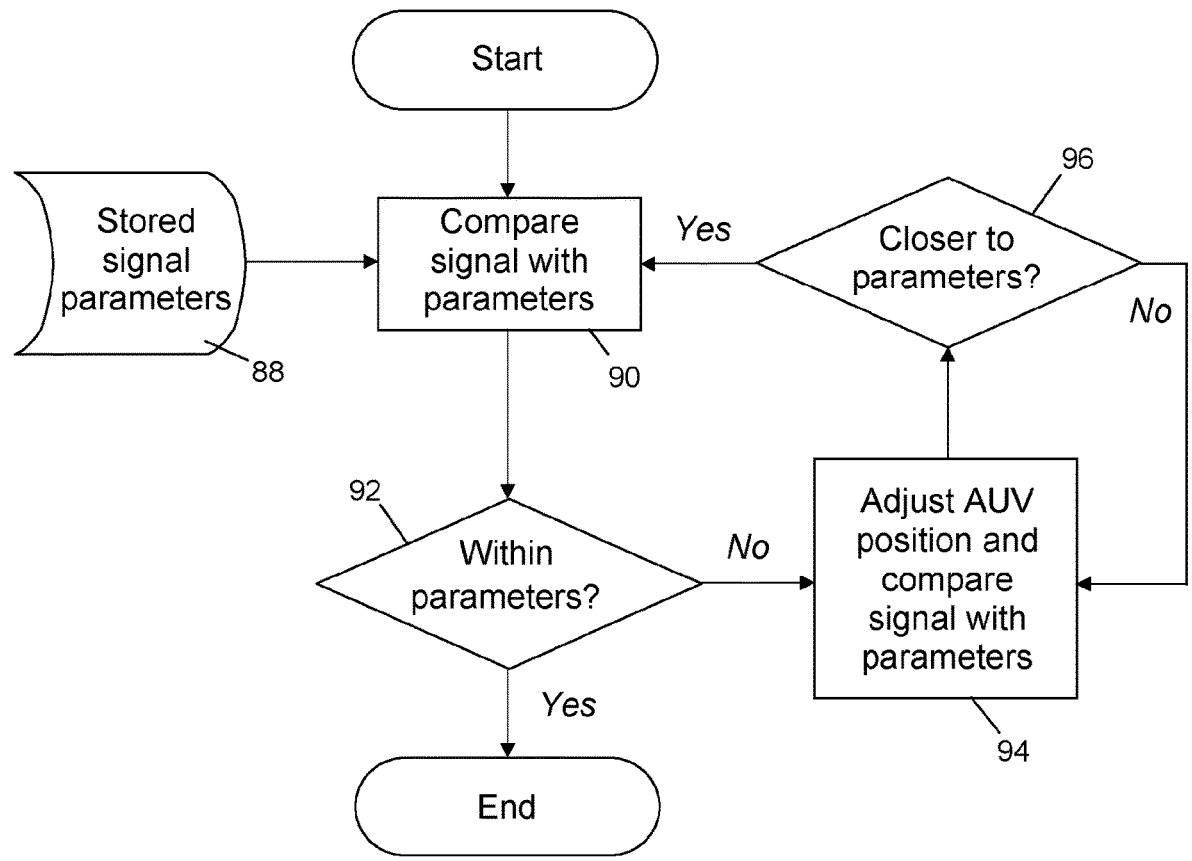

FIG. 3 corresponds to FIG. 2 but shows an AUV of the invention transiting from a first subsea structure toward a second subsea structure;

FIG. 4 corresponds to FIG. 3 but shows the AUV having launched a tethered UUV to inspect equipment supported by the second subsea structure;

FIG. 5 corresponds to FIG. 3 but shows the AUV adjusting its position autonomously to improve data communication with the first subsea structure;

FIG. 6 is a schematic plan view of subsea infrastructure shown in FIG. 1 in a variant of the invention in which the UUV is untethered and communicates wirelessly with the AUV;

FIG. 7 is a block diagram showing principal system components of the AUV and the UUV; and FIG. 8 is a flow diagram of how the AUV may adjust its position autonomously to improve data communication.

Referring firstly to FIG. 1, an umbilical 10 connects subsea infrastructure 12 on the seabed 14 to a facility 16 on the surface 18, such as a platform or a floating production, storage and offloading (FPSO) vessel as shown. Via the umbilical 10, the surface facility 16 provides power and communications data to the subsea infrastructure 12 and receives communications data from the subsea infrastructure 12.

The subsea infrastructure 12 comprises first and second subsea structures, in this example being a template 20 and a towhead 22 at an end of a pipeline bundle 24, shown here end-on. The template 20 is positioned a short distance across the seabed 14 from the towhead 22 and is connected to the towhead 22 by pipes, power lines and data cables shown collectively at 26.

The template 20 houses various items of subsea equipment 28. Access for a UUV to the interior of the template 20 to perform IRM operations on the equipment 28 is most commonly provided through side openings of the template 20.

As is common, the template 20 has a structure or frame that extends over the items of equipment 28 to protect them from hazards such as overtrawling and dropped objects. Consequently, access for a UUV to and between the items of equipment 28 is restricted not only by the proximity of those items to each other but also by the nearby presence of structural or protective members of the template 20, such as columns, beams or panels.

An AUV 30 is shown in FIG. 1 flying from the towhead 22 toward the template 20 to perform IRM operations on an item of equipment 28 in the template 20. As will be explained, the AUV 30 is capable of autonomous operation, for example to fly to the template 20 and to position itself for optimal data communication. The AUV 30 is also capable of acting on or conveying control signals arising from human pilot input, in particular as a communications relay to facilitate IRM operations once at the template 20. For this purpose, control signals are transmitted wirelessly through water to the AUV 30, conveniently from the towhead 22 or from another structure forming part of, or connected to, the subsea infrastructure 12.

In this example, the surface facility 16 communicates with a remote station 32, most conveniently via a satellite broadband system 34. However, in principle, a hard-wired data connection between the surface facility 16 and the remote station 32 would be possible instead. Any such remote station 32 will typically, but not necessarily, be situated on land. An onshore-offshore system is shown in the example of FIG. 1, with onshore elements to the left and offshore elements to the right.

A human operator 36 may be located on board the surface facility 16 or at the remote station 32 as shown. Thus, data communication between the operator 36 and the AUV 30 is effected via the umbilical 30 and the towhead 22. Collectively, therefore, the umbilical 30 and the towhead 22 are elements of a communications link between the operator 36 and the AUV 30. In this example, further elements of the communications link are the surface facility 16 and the data connection between the surface facility 16 and the remote station 32, for example via the satellite broadband system 34.

Data carried by the communications link may include mission-planning data; remote maintenance or diagnostic data; still images; or video signals. Video signals may be low-resolution or higher resolution depending upon the bandwidth afforded by the various successive elements of the communications link, most critically the wireless through-water data connection between the towhead 22 and the AUV 30.

The operator 36 can plan missions offshore aboard the surface facility 16 or onshore at the remote station 32. There, the operator 36 can conduct commissioning checks on the system, run test missions and plan real missions. Mission plans may then be uploaded to the AUV 30 via the communications link. The communications link is also used to send stop and start commands to the AUV 30.

Referring next to the schematic plan views of FIGS. 2 to 5, like numerals are used for like features. Here, the towhead 22, the pipeline bundle 24 and the template 20 are shown together as parts of the subsea infrastructure 12 on the seabed 14. Again, the template 20 is connected to the towhead 22 by pipes, power lines and data cables 26.

Items of equipment 28 are shown supported by the template 20 beside structural members 38 of the template 20. One of those items of equipment 28 has a control interface 40 that is a target for inspection in this example. It will be apparent that the inboard position of the control interface 40 is challenging to access in view of the proximity of other items of equipment 28 and the surrounding structural members 38 of the template 20.

Conveniently, as shown here, the AUV 30 may be housed in a garage 42 on the towhead 22. However, the AUV 30 could instead be housed in or connected to a garage or dock on the template 20 or indeed in a basket or other structure forming part of, or connected to, the subsea infrastructure 12.

In this example, wireless through-water communication with the AUV 30 is effected by transducers 44 on the towhead 22 and the AUV 30 that support a high-bandwidth free-space optical data link between them. An acoustic data link may also be an option but is less preferred in view of its lower bandwidth. Radio frequency (RF) transmission of signals may also be possible. Subsea optical, acoustic and RF data links are well known in the art and require no elaboration here. Similarly, the concurrent use of any number of transducers 44 to communicate with one AUV 30 is well known in the art.

A communications and processing unit 46 on the towhead 22 processes and conveys signals bi-directionally between the umbilical 10 and the transducer 44 on the towhead 22. Optionally, as shown, the communications and processing unit 46 is also connected to the AUV 30 via the garage or dock 42 of the towhead 22. This enables data to be uploaded to, or downloaded from, the AUV 30 when the AUV 30 is docked 38 with the towhead 22.

It will be apparent that the items of equipment 28 and the surrounding structural members 38 of the template 20 may block line-of-sight communication with the transducer 44 on the towhead 22. This creates a first shadow region 48 in which effective wireless through-water communication between the transducers 44 on the towhead 22 and the AUV 30 may not be possible. As the shadow region 48 encompasses the area around the control interface 40, it follows that the AUV 30 cannot itself perform a mission that involves close inspection of the control interface 40.

Thus, in accordance with the invention, the AUV 30 carries and cooperates with a package or payload being a functional unit that is exemplified here by a daughter craft in the form of an auxiliary UUV 50. The AUV 30 and the UUV 50 are in master-slave relation. The UUV 50 shown here is carried by the AUV 30 in a dock 52 of the AUV 30. Thus, the UUV 50 is smaller than the AUV 30, which is desirable to access difficult-to-reach locations, although such relative dimensions are not essential.

The AUV 30 and the UUV 50 are each equipped with thrusters 54 for self-propulsion so as to be manoeuvrable independently of each other. Those skilled in the art will appreciate that the AUV 30 and the UUV 50 may also be equipped with other features for inspection, support and intervention, such as lights, cameras and robotic arms. Such other features have been omitted from the drawings for simplicity. Those skilled in the art will also appreciate the one AUV 30 can also host multiple UUVs 50, which may have the same or different functions and/or tools.

Firstly, on receiving a start command via the communications link from the operator 36, the AUV 30 undocks from the towhead 22 as shown in FIG. 2 and begins its mission. Specifically, the AUV 30 carrying the UUV 50 is flown out from the docked position in the garage 42 on the towhead 22 as shown in FIG. 2 to a position close to a side opening of the template 20 as shown in FIG. 3.

By continuously monitoring the strength and quality of the data signal between the transducers 44, the AUV 30 steers itself away from straying too far into the shadow region 48 as it flies toward the template 20. In this way, the AUV 30 keeps its transducer 44 outside the shadow region 48. Thus, the transducer 44 of the AUV 30 remains in an accessible region 56 in which line-of-sight communication with the transducer 44 of the towhead 22 is maintained.

In this example, a second shadow region 58 has been created inadvertently by thruster wash from the AUV 30 throwing up a dense cloud of silt 60 from the seabed 14. It will be apparent that this second shadow region 58 narrows the accessible region 56 and could drift with subsea current to restrict the accessible region 56 further. The size and position of the accessible region 56 is therefore a variable to which the AUV 30 may have to respond by repositioning itself dynamically to maintain effective line-of-sight communication between the transducers 44.

FIG. 4 shows the UUV 50 now flown out from the AUV 30 while the AUV 30 remains on station beside and outside the template 20. The AUV 30 conveys control signals to the UUV 50 to effect real-time control of the position and status of the UUV 50. The UUV 50 feeds back to the AUV 30 video signals and other feedback signals arising from the mission.

In FIG. 4, the UUV 50 has reached the control interface 40 that is the target of the mission. To get there, the UUV 50 entered the template 20 through a side opening and was then steered through a narrow gap between an item of equipment 28 and a structural member 38 of the template 20. That gap is too small for the AUV 30 to enter the template 20, even if it would be possible to maintain line-of-sight communication between the transducers 44 of the towhead 22 and the AUV 30.

In this embodiment, the UUV 50 is connected to the AUV 30 by a tether 62 that carries data bi-directionally between the UUV 50 and the AUV 30. The tether 62 contains a hard physical data connection such as a fibre-optic connection to enable real-time control of the UUV 50 via the AUV 30. That connection also provides for the transmission of video signals from the UUV 50 to the AUV 30.

An advantage of a tethered connection between the UUV 50 and the AUV 30 is that there is no need for line-of-sight data communication between the UUV 50 and the AUV 30. This allows the UUV 50 to reach places where wireless data communication with the AUV 30 could otherwise be obscured by intervening obstacles such as items of equipment 28 or structural members 38 of the template 20.

The tether 62 should be long enough that it does not unduly limit the excursion range or working radius of the UUV 50 relative to the AUV 30, but short enough that it does not present an excessive risk of entanglement.

Conveniently, the tether 62 may be stored on a reel 64 onboard the AUV 30 as shown. The tether 62 is paid out from the reel 64 as the UUV 50 moves away from the AUV 30 and is wound back onto the reel 64 as the UUV 50 moves toward the AUV 30. This minimises any risk of entanglement. Also, if the UUV 50 becomes stuck among the items of equipment 28, the AUV 30 can wind in, or otherwise pull on, the tether 62 in an attempt to pull the UUV 50 free.

While the AUV 30 remains on station outside the template 20, it continues to monitor the strength and quality of the data signal between the transducers 44. If necessary, the AUV 30 may adjust its position autonomously to keep its transducer 44 in the accessible region 56.

The AUV 30 may adjust its position autonomously not just to keep its transducer 44 in the accessible region 56 but also to maximise the strength and quality of the data signal between the transducers 44. This may, for example, be achieved by the AUV 30 moving itself as close as possible to the transducer 44 of the towhead 22 while remaining in the accessible region 56 while also, of course, remaining in data communication with the UUV 50.

For example, FIG. 5 shows the AUV 30 still in the accessible region 56 but having moved itself closer to the transducer 44 of the towhead 22. The UUV 50 remains in position inspecting the control interface 40. The tether 62 that maintains data communication between the UUV 50 and the AUV 30 is paid out from the reel 64 as the AUV 30 moves closer to the towhead 22 and hence moves away from the UUV 50.

When the UUV 50 has collected the desired inspection data or the monitored process or intervention task is complete, the UUV 50 docks with the AUV 30 and the AUV 30 then returns autonomously to dock with the towhead 22 to recharge its on-board batteries and those of the UUV 50. After the batteries of the AUV 30 and the UUV 50 have been charged sufficiently, the AUV 30 remains docked with the towhead 22 to await further instructions. The docked AUV 30 can be reprogrammed if necessary and then redeployed on further missions.

Optionally, once the host AUV 30 is docked with the towhead 22, the UUV 50 can perform a full data download of stored video, sonar and navigation data to be transmitted via a data buffer in the towhead 22 and up the umbilical 10 for further detailed analysis or processing on board the surface facility 16 or at the remote station 32 as shown in FIG. 1.

Whilst a tethered connection between a UUV 50 and a host AUV 30 as shown in FIGS. 2 to 5 has certain advantages as noted above, it is possible instead to effect wireless through-water communication between such a pair of craft. This removes any risk of entanglement of a tether and also avoids the finite length of a tether limiting the radius of excursion of a UUV from a host AUV. However, in this case the radius of excursion is not unlimited but instead is governed by the capability of the wireless link to support real-time communication. For example, the typical range limit for efficient wireless broadband communication in water is about 200 m.

In this respect, FIG. 6 shows a second embodiment of the invention in which, again, like numerals are used for like features. Here, an AUV 66 communicates wirelessly with an auxiliary UUV 68 through transducers 70 on the respective craft. As before, the AUV 66 also has a transducer 44 for wireless communication with a corresponding transducer 44 on an item of subsea infrastructure 12, which again is exemplified here by a towhead 22.

Wireless communication between the AUV 66 and the UUV 68 may be subject to line-of-sight constraints. For example, FIG. 6 shows that an item of equipment 28 of the template 20 between the UUV 68 and the AUV 66 creates a third shadow region 72. This third shadow region 72 significantly restricts the accessible region 56 in which the AUV 66 can maintain line-of-sight wireless communication with both the transducer 44 of the towhead 22 and the transducer 70 of the UUV 68.

Thus, the AUV 66 must position itself autonomously at a location that allows a good compromise of signal strength and quality for communications with both the towhead 22 and the UUV 68. In FIG. 6, for example, the AUV 66 is shown having moved away from the towhead 22. Whilst this may slightly lessen the strength and quality of the signal between the AUV 66 and the towhead 22, it is necessary to keep the AUV 66 out of the third shadow region 72 and thus to maintain wireless communication with the UUV 68.

When there is an effective data communications link between the towhead 22 and the UUV 68 through the transducers 44, 70 and the AUV 66, the operator 36 can assume tele-robotic control of the UUV 68. Also, bandwidth permitting, video signals may be streamed back to the operator 36 from the UUV 68 via the AUV 66 and the communications link. This allows the UUV 68 to remain on station under tele-robotic control of the operator 36, observing a subsea process, an item of subsea hardware or performing a task while relaying pictures to the surface. Thus, the operator 36 can view, monitor and control execution of missions in real time while the AUV 66 positions itself autonomously to serve as a communications relay.

Real-time monitoring of the AUV 66 and UUV 68 may be maintained during a mission for as long as effective real-time wireless data communication with those craft 66, 68 is maintained. If either craft 66, 68 flies to a location at which such communication cannot be maintained, that craft 66, 68 may operate fully autonomously until such time as effective data communication is regained. However, using well-known acoustic technology, the operator 36 can continue to monitor the position of the craft 66, 68 while they operate autonomously.

FIG. 7 shows the principal system components of the AUV 30, 66 and the UUV 50, 68 of the foregoing embodiments in the form of a block diagram. In essence, the system components of the AUV 30, 66 are mirrored by the system components of the UUV 50, 68. Like numerals are therefore used for like components.

The AUV 30, 66 and the UUV 50, 68 each have an onboard power unit 74 that comprises rechargeable batteries. The power unit 74 provides electrical power to the other system components, namely a programmable controller 76, a communications interface 78, a drive system 80 and functional attachments 82 that typically comprise tools, sensors, lights and cameras.

The controller 76 controls the communications interface 78, the drive system 80 and the functional attachments 82 and is connected to a memory 84 to store and retrieve data and programs. The controller 76 receives signals and feedback from the communications interface 78 and from the functional attachments 82.

The communications interfaces 78 of the AUV 30, 66 and the UUV 50, 68 effect bi-directional communication with each other across a communications link 86. The communications link 86 may be implemented by the tether 62 in the first embodiment shown in FIGS. 2 to 5 or wirelessly by the transducers 70 in the second embodiment shown in FIG. 6.

Via one of the transducers 44, the communications interface 78 of the AUV 30, 66 also effects bi-directional communication with an item of subsea infrastructure such as the towhead 22 shown in FIGS. 1 to 6.

The drive system 80 controls the speed and direction of the aforementioned thrusters 54 to change or hold the position of the AUV 30, 66 or the UUV 50, 68.

Turning finally to FIG. 8, this simplified flow diagram illustrates how the AUV 30, 66 may adjust its position autonomously to continue serving effectively as a data communications relay for the UUV 50, 68. To do so, the AUV 30, 66 must aim to keep its transducer 44 in the accessible region 56 and must not stray significantly into any of the shadow regions 48, 58, 72.

The following principles may be applied to the maintain wireless link between the AUV 30 and the towhead 22 or other item of subsea infrastructure 12. Similar principles may be applied to maintain the wireless link between the AUV 66 and the UUV 68 in the second embodiment shown in FIG. 6.

At 88, the controller 76 of the AUV 30, 66 retrieves acceptable parameters of stored signal strength or quality from the memory 82. At 90, the controller 76 compares measured parameters of signal strength or quality, as detected by the communications interface 78, with the stored parameters retrieved from the memory 82. At 92, the controller 76 decides whether the measured signal parameters are in accordance with the stored signal parameters.

If the measured signal parameters are in accordance with the stored signal parameters, the AUV 30 does not need to change its position. However, the steps of the flow diagram should be repeated intermittently or continuously in case the AUV 30 may drift into a shadow region 48, 58, 72 or in case the signal may otherwise become obscured, for example due to drifting of silt 60 thrown up by thruster wash.

If the measured signal parameters are not in accordance with the stored signal parameters, the AUV 30 needs to change its position. At 94, the controller 76 therefore commands the drive system 80 to change the speed and/or direction of the thrusters 54 to move the AUV 30, 66. Then, the controller 76 again compares measured parameters of signal strength or quality, as detected by the communications interface 78, with the stored parameters retrieved from the memory 82. At 96, the controller 76 decides whether the measured signal parameters are closer to the stored signal parameters.

If the measured signal parameters are closer to the stored signal parameters, the controller repeats steps 90 and 92 to compare the measured parameters with the stored parameters and to decide whether the measured parameters are in accordance with the stored parameters. If the measured signal parameters are not in accordance with the stored parameters, but are closer to the stored parameters by virtue of the new position of the AUV 30, the controller 76 can infer that further movement of the AUV 30 in the same direction may lead to a further improvement in the measured signal parameters.

If the measured signal parameters are not closer to the stored signal parameters, the controller 76 can infer the AUV 30 must be moved in a different direction to seek an improvement in the measured signal parameters. Eventually, with further movement of the AUV 30, the measured signal parameters may improve to be closer to the stored signal parameters, whereupon the controller 76 can infer that further movement of the AUV 30 in the same direction may be beneficial until the measured signal parameters are in accordance with the stored signal parameters.

Whilst the invention enables long-term, substantially permanent subsea deployment and hosting of an AUV system via subsea infrastructure, elements of the system may require periodic recovery to the surface for cleaning and maintenance. For example, marine growth may be cleaned off, anti-corrosion anodes may be replaced, and thrusters, hydraulics, sensors and other moving parts may be replaced or maintained. If desired, the system or its elements may be swapped out to minimise downtime.

Many variations are possible within the inventive concept. For example, it is possible that a transducer on an item of subsea infrastructure could be a node of a subsea mesh network that comprises multiple nodes defined by multiple transducers.

Also, the auxiliary UUV need not be carried by the AUV but could be manoeuvrable independently to a target location and could be garaged or docked separately from the AUV.

A functional unit that performs a subsea task need not be a UUV but could instead be another controllable unit such as a sensor package or a tool package that can be placed on, beside or attached to a structure installed subsea. Such a unit may propel itself along the structure or may remain fixed relative to the structure.

Whilst the shadow regions have been represented two-dimensionally in the drawings for ease of illustration, it will be appreciated that the problems of shadowing and difficulty of access addressed by the invention are experienced in three dimensions in practice. For example, a UUV may be required to enter a subsea structure such as a template in a generally vertical direction from above rather than in a generally horizontal direction from the side.

The invention claimed is:

1. A method of performing a task at a subsea location, the method comprising:
   positioning a unit to perform the task, the unit then being in a shadow region where wireless control signals from a subsea control transmitter are obscured by a subsea obstacle;
   transmitting control signals wirelessly through water from the control transmitter to an autonomous underwater vehicle (AUV) positioned outside the shadow region;
   relaying the control signals from the AUV to the unit to control the unit to perform the task;
   monitoring signal quality of the control signals transmitted wirelessly from the control transmitter to the AUV; and
   moving the AUV to improve the signal quality of the control signals.

2. The method of claim 1, comprising moving the AUV toward the control transmitter to improve the signal quality of the control signals.

3. The method of claim 1, wherein the AUV monitors the signal quality of the control signals transmitted wirelessly from the control transmitter and moves itself autonomously to improve the signal quality of the control signals.

4. The method of claim 1, comprising:
   carrying the unit, attached to the AUV, toward the subsea location; and
   with the AUV hovering in an accessible region where the AUV can receive wireless control signals from the control transmitter, detaching the unit from the AUV to enter the shadow region and to perform the task at the subsea location.

5. The method of claim 1, comprising relaying the control signals from the AUV to the unit along a tether that connects the unit to the AUV.

6. The method of claim 5, comprising extending the tether from the unit or the AUV as the unit moves away from the AUV or vice versa.

7. The method of claim 5, comprising retracting the tether onto the unit or the AUV as the unit moves toward the AUNT or vice versa.

8. The method of claim 5, comprising moving the AUV closer to the subsea location than a deployed length of the tether.

9. The method of claim 1, comprising relaying the control signals wirelessly through water from the AUV to the unit.

10. The method of claim 9, comprising transmitting feedback signals wirelessly through water from the unit to the AUV.

11. The method of claim 10, comprising:
    monitoring signal quality of the feedback signals; and
    moving the AUV to improve the signal quality of the feedback signals.

12. The method of claim 11, comprising moving the AUV toward the unit to improve the signal quality of the feedback signals.

13. The method of claim 11, wherein the AUV monitors the signal quality of the feedback signals and moves itself autonomously to improve the signal quality of the feedback signals.

14. The method of claim 11, comprising moving the AUV to avoid a secondary shadow region where wireless signals from the unit are obscured by a subsea obstacle.

15. The method of claim 1, comprising conveying the control signals to the subsea control transmitter along a wired or wireless link from a surface source.

16. The method of claim 15, wherein the control signals comprise instructions issued by a human operator in real time.

17. The method of claim 1, wherein the unit is an armed underwater vehicle (UUV).

18. The method of claim 17, comprising moving the UUV and the AUV independently of each other's movements while relaying the control signals from the AUV to the UUV.

19. The method of claim 1, comprising moving the AUV autonomously and automatically.

20. A system for performing a task at a subsea location, the system comprising:
    a subsea control transmitter for transmitting wireless control signals through water;
    a unit that is positionable to perform the task in response to the control signals transmitted by the control transmitter;
    an autonomous underwater vehicle (AUV) that is positionable to receive the control signals from the control transmitter and to relay the control signals to the unit to control the unit to perform the task;
    a signal monitor that is arranged to monitor signal quality of the control signals received by the AUV; and
    a controller that is responsive to the signal monitor to move the AUV to improve the signal quality of the control signals received by the AUV.

21. The system of claim 20, wherein the signal monitor and the controller are implemented on board the AUV.

22. The system of claim 20, comprising a wireless link that connects the unit to the AUV to convey the control signals to the unit and to receive feedback signals from the unit.

23. The system of claim 22, wherein the signal monitor is arranged to monitor signal quality of the feedback signals received by the AUV and the controller is responsive to the signal monitor to move the AUV to improve the signal quality of the feedback signals received by the AUV.

24. The system of claim 20, comprising a tether that connects the unit to the AUV to convey the control signals to the unit and to receive feedback signals from the unit.

25. The system of claim 24, comprising a reel on the unit or the AUV from which the tether can be extended as the unit moves away from the AUV or vice versa, and onto which the tether can be retracted as the unit moves toward the AUV or vice versa.

26. The system of claim 20, wherein the control transmitter is located on or integrated with a structure installed permanently subsea.

27. The system of claim 20, wherein the control transmitter is static.

28. The system of claim 20, wherein the unit is an unmanned underwater vehicle (UUV).

29. The system of claim 28, wherein the UUV is dockable with and detachable from the AUV.

30. The system of claim 20, further comprising a dock for the AUV, the dock being provided on a structure installed permanently subsea.

31. The system of claim 20, wherein the AUV is movable autonomously and automatically.

32. An autonomous underwater vehicle (AUV) comprising:
    a first signal receiver for receiving control signals wirelessly;
    a communications interface for relaying the received signals to a separate unit;
    a signal monitor that is arranged to monitor signal quality of the received signals received by the receiver; and a controller that is responsive to the signal monitor to move the AUV to improve the signal quality of the received signals.

33. The AUV of claim 32, further comprising a tether for relaying the received signals to the unit.

34. The AUV of claim 33, further comprising a reel from which the tether can be extended as the unit moves away from the AUV or vice versa, and onto which the tether can be retracted as the unit moves toward the AUV or vice versa.

35. The AUV of claim 32, further comprising a first signal transmitter for relaying the received signals to the separate unit wirelessly.

36. The AUV of claim 32, wherein the communications interface is arranged to relay feedback signals received from the unit.

37. The AUV of claim 36, further comprising a second signal receiver for receiving the feedback signals from the unit wirelessly.

38. The AUV of claim 37, wherein the signal monitor is arranged to monitor signal quality of the received feedback signals and the controller is responsive to the signal monitor to move the AUV to improve the signal quality of the received feedback signals.

39. The AUV of claim 36, further comprising a second signal transmitter for relaying the received feedback signals wirelessly.

40. The AUV of claim 32, being movable autonomously and automatically.

* * * * *